United States Patent [19]
Slattery

[11] Patent Number: 4,733,848
[45] Date of Patent: Mar. 29, 1988

[54] LATCH FOR DECK MOUNTED ELECTRIC OUTBOARD

[75] Inventor: Gordon C. Slattery, Omro, Wis.

[73] Assignee: Brunswick Corporation, Skokie, Ill.

[21] Appl. No.: 944,651

[22] Filed: Dec. 22, 1986

[51] Int. Cl.$^4$ .............................................. F16M 13/00
[52] U.S. Cl. ..................................... 248/642; 248/681; 440/6; 440/53; D12/317
[58] Field of Search ............... 248/642, 640, 641, 680, 248/681; 292/210, 256.5, 257, DIG. 49; 440/6, 7, 55, 53, 63; D12/317

[56] References Cited

U.S. PATENT DOCUMENTS

| | | | |
|---|---|---|---|
| 930,534 | 8/1909 | Cox | 292/210 X |
| 2,901,279 | 8/1959 | MacNaught et al. | 292/256.5 |
| 3,874,318 | 4/1975 | Langley | 440/63 X |
| 3,985,380 | 10/1976 | Raivio | 292/210 X |
| 3,999,500 | 12/1976 | Friedel et al. | 440/6 |
| 4,008,680 | 2/1977 | Alexander, Jr. | 440/6 |
| 4,057,020 | 11/1977 | Halliar et al. | 292/257 |
| 4,410,161 | 10/1983 | Booty | 248/642 |

FOREIGN PATENT DOCUMENTS

| | | | |
|---|---|---|---|
| 1360531 | 3/1964 | France | 292/257 |

*Primary Examiner*—J. Franklin Foss
*Assistant Examiner*—David L. Talbott
*Attorney, Agent, or Firm*—Andrus, Sceales, Starke & Sawall

[57] ABSTRACT

An over-center type latching device used to hold a deck mounted electric outboard in its retracted position on the deck of a boat. The latching device includes an arm member pivotally mounted at one end to a mounting bracket for the electric outboard, and a head member pivotally mounted to the other end of the arm member. The head member receives and fits around the support tube of the electric outboard, and is rotated over-center so that the spring pressure of the tube holds the latching device in a latched position. The head member may also include a lever for ease of operation and a safety lock that prevents it from being rotated until the safety lock is manually deactivated.

7 Claims, 4 Drawing Figures

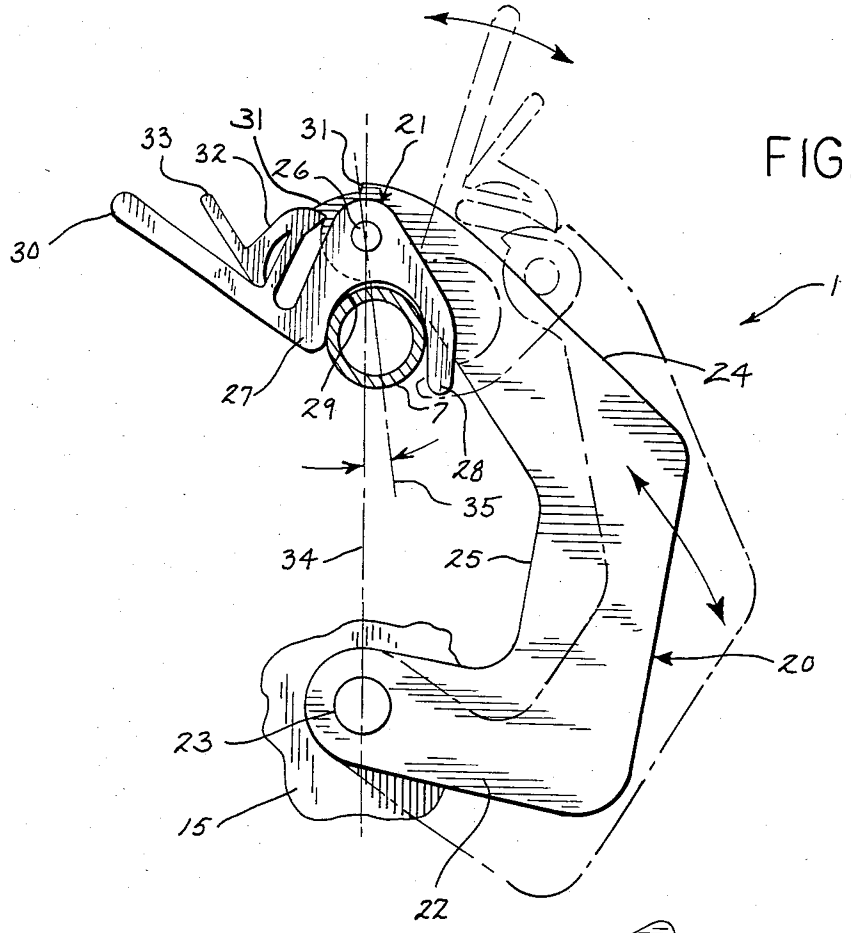
FIG. 3
FIG. 4
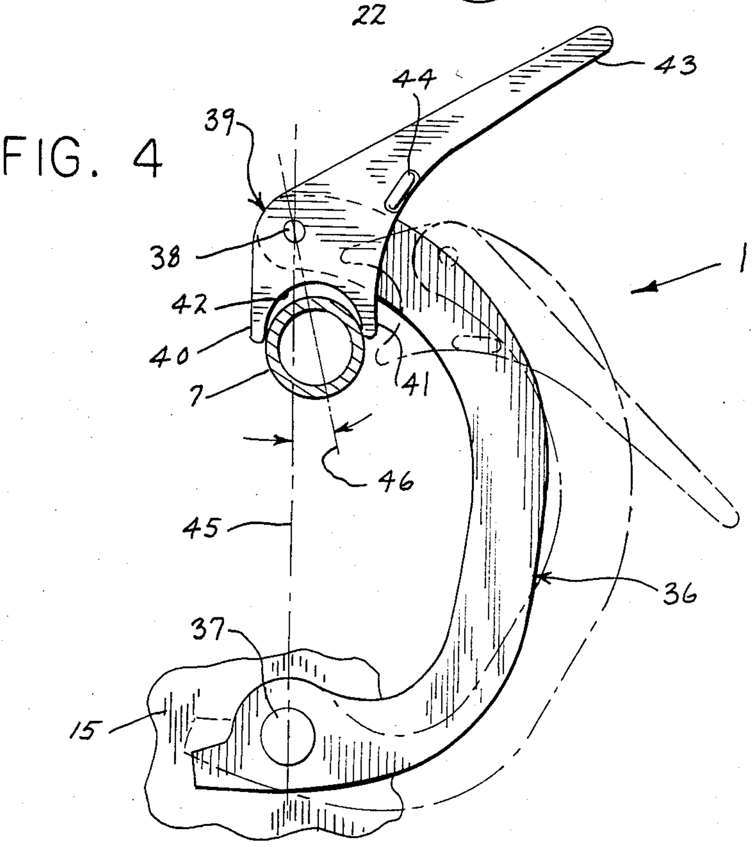

LATCH FOR DECK MOUNTED ELECTRIC OUTBOARD

BACKGROUND OF THE INVENTION

The present invention relates to outboard motors, and more particularly to a latching device used to hold a deck mounted trolling motor unit in its retracted position on the boat deck.

In bass fishing and the like, a trolling motor unit is often employed by a fisherman to vary slowly maneuver, position, and hold the watercraft or boat in proper positioning for casting. Generally the trolling motor unit is mounted to a horizontal deck at the forward end of the watercraft. The mounting includes a pivotal mount assembly to provide movement between an operating or run position wherein the motor unit depends fro the front of the boat for propulsion of the boat, and a retracted position wherein the trolling motor unit is raised from its operating position and placed in a transport position on the deck. A separate high powered outboard motor or stern drive is generally employed for rapid propulsion of the boat to and from the fishing location area.

The trolling motor unit will normally include a depending tube or pipe-like support mounted in a swivel bracket. The tube or pipe-like support terminates at the lower end in a lower unit within which a small electric motor is housed for direct driving of the propeller. The upper end of the support tube includes a steering mechanism for angular positioning of the lower unit for steering of the watercraft. The propeller speed is controlled by varying the energization of the electric motor. The steering and speed controls are normally switch controls located within the boat coupled by suitable lines and cables to the motor and to the support tube.

A variety of pivotal mount assemblies for small outboards such as trolling motor units are disclosed in the prior art. One such device is disclosed in U.S. Pat. No. 3,674,228 and Reissue No. 28,176 to Horton in which two unequal length arms are pivotally attached to a bracket mounted on the boat deck. Other mounting arrangements are shown in U.S. Pat. Nos. 3,874,318 to Langley, 3,870,258 to Shimankas et al, 3,948,472 to Metcalf, 3,999,500 to Friedal et al, and 4,410,161 to Booty.

Prior pivotal mount assemblies such as those noted above have also utilized various devices for holding the trolling motor unit in its retracted position on the deck. For example, in U.S. Pat. No. 3,999,500 a tie-down strap is provided to secure the unit to a mounting bracket. The strap is typically a resilient rubber-like strap with one end fixed to one side of the bracket and of sufficient length to loop over the trolling motor to be releasably connected to the opposite side of the bracket to hold the trolling motor in its transport or retracted position. Another latching device is shown in U.S. Pat. No. 4,410,161, and includes a fold-down support member and a flexible clamp arm which is pivotally attached to the support member. The clamp arm has a hook at its outer end to snap over a notch formed in the support member to lock the support tube of the trolling motor unit in its retracted position.

SUMMARY OF THE INVENTION

The present invention is directed to an overcenter type latching device used to hold a deck mounted electric outboard in its retracted position. The latching device of the present invention provides a positive locking arrangement, improved durability, and ease of operation especially in that the device can be latched or unlatched by the operator's foot.

The latching device includes an arm member pivotally mounted at one end to a bracket of a pivotal mount assembly for the outboard unit, and a head member pivotally mounted to the other end of the arm member. The head member receives and fits around a motor support member, preferably the support tube of the outboard unit, when in its retracted position, and is rotated overcenter so that the spring pressure of the support tube holds it in its latched position. The head member includes a lever that provides a mechanical advantage for ease of operation, and may also include a safety lock that prevents it from being rotated to an unlatched position until the safety lock is manually deactivated.

In one aspect of the invention, the safety lock is in the form of a ratchet and pawl mechanism with the ratchet teeth formed on the outer circumference of the outer end of the arm member, and the pawl formed on the head member. In another aspect of the inventin, the safety lock may comprise a detent formed on the head member engageable with the arm member to hold the head member in its latched position.

The present invention thus provides an overcenter type latching device used to hold a deck mounted electric outboard in its retracted position. The structure of the invention can be manufactured as a durable, long life assembly which is conveniently and safely operable by the boater or fisherman.

BRIEF DESCRIPTION OF THE DRAWINGS

The drawings illustrate the best mode presently contemplated of carrying out the invention.

In the drawings:

FIG. 3 is an enlarged side view in elevation of the latching device of FIGS. 1 and 2 showing the latching device in its latched position in solid lines and in its unlatched position in phantom lines; and FIG. 4 is a side view in elevation similar to FIG. 3 illustrating a second embodiment of the latching device.

DESCRIPTION OF THE PREFERRED EMBODIMENTS

Figure 1:
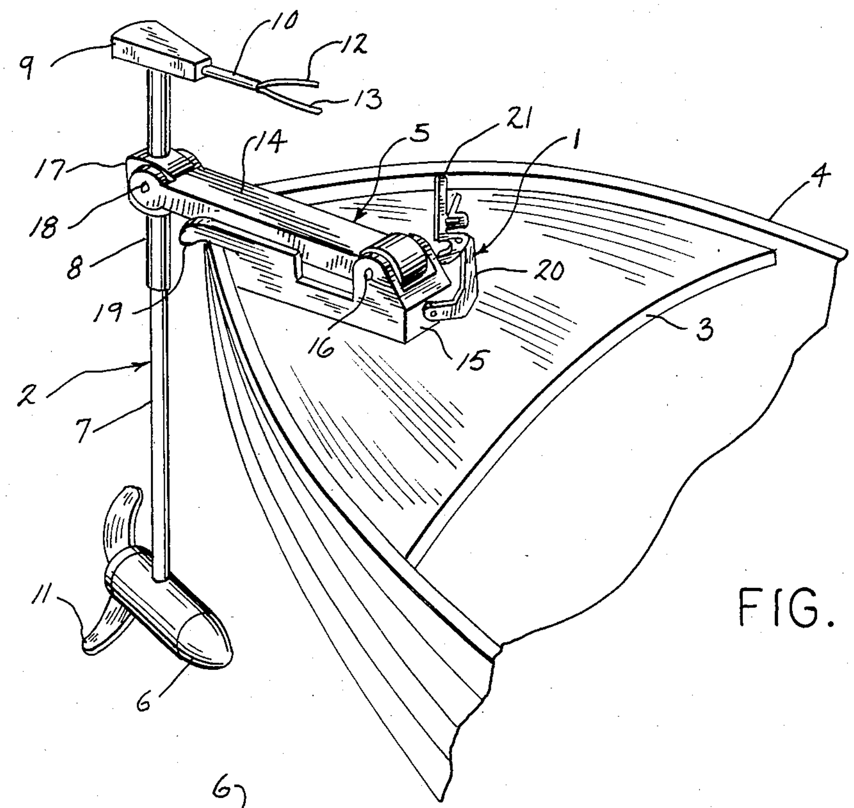
FIG. 1 is a fragmentary perspective view of the front end of a boat having a trolling motor unit mounted thereon in its operating or run position and incorporating a latching device in its unlatched position in accordance with the present invention.
Figure 2:
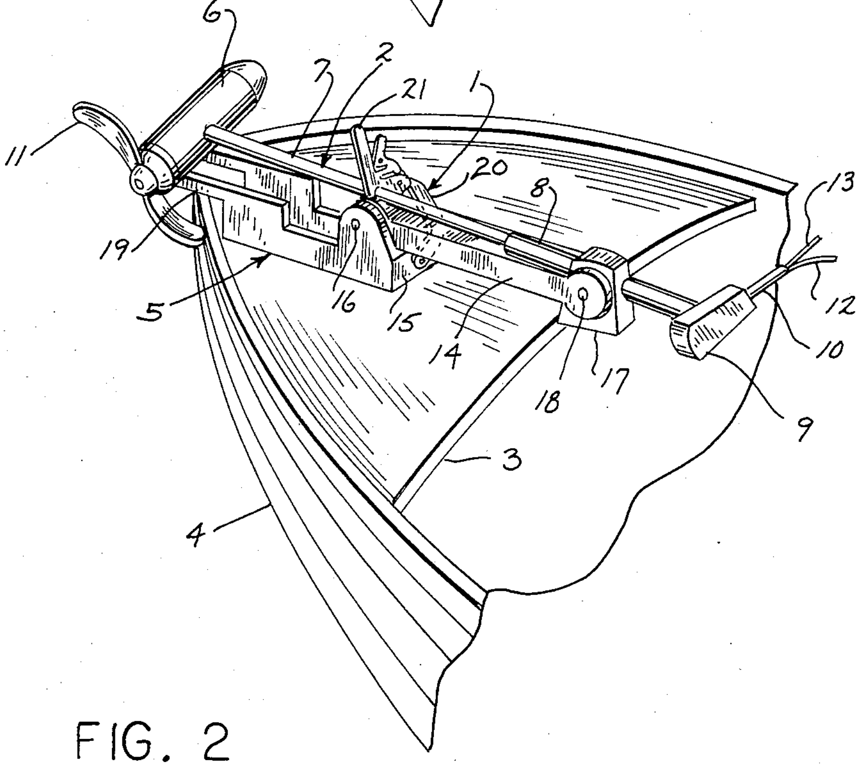
FIG. 2 is a view similar to FIG. 1 showing the trolling motor unit in its retracted or transport position and the latching device in its latched position.

Referring now to the drawings and particularly to FIGS. 1 and 2, the present invention is directed to the construction of an over-centered type latching device generally designated by the numeral 1 used to hold a deck mounted electric outboard such as trolling motor unit 2 in its retracted position. The trolling motor unit 2 is secured to a forward substantially horizontal deck 3 of a watercraft or boat 4 by a suitable pivotable mount assembly 5. The pivotable mount assembly 5 provides for selective positioning of the trolling motor unit 2 between a depending operating or run position shown in FIG. 1 and a raised transport or retracted position shown in FIG. 2 wherein the trolling motor unit 2 rests on deck 3 and generally within the confines of the outermost edge of boat 4. Thus, trolling motor unit 2 is uniquely adapted for application to bass fishing and the like wherein accurate maneuverability at very low speeds is desired. In such systems, however, boat 4 will generally be provided with a completely alternative high speed drive such as an outboard motor or a stern drive (not shown) for propelling boat 4 at high speed to and from the fishing location.

The trolling motor unit 2 may be of any suitable construction, and is therefore only generally described hereinafter. Trolling motor unit 2 includes a lower unit 6 secured to the lower end of a tubular support 7 in the form of a smooth pipe member. The tube or pipe member 7 in turn is rotatably mounted within a swivel tube 8 with its end terminating in a head 9 having a handle 10 projecting therefrom. The lower unit 6 houses a suitable electric motor (not shown) which is coupled to rotate a propeller 11 secured to the aft end of lower unit 6 in accordance with conventional practice. The level of energization of the electric motor is controlled by the boat operator or fisherman to vary the speed of propeller 11. Thus, suitable power leads 12 are shown which extend from the electric motor within unit 6 to a control circuit (not shown) which may also be located within unit 6 through the pipe member 7, head 9, and handle 10 for interconnection to a suitable power supply such as a battery (not shown in series with a suitable variable current control unit (not shown) located within boat 4. Generally, the control unit will be a foot operated device to allow the fisherman to control the speed of propeller 11 and thus the propulsion of boat 4 without interfering with casting and the like.

In addition and in accordance with conventional practice, trolling motor unit 2 is rotated within swivel tube 8 for turning and steering movement of boat 4. In the illustrated embodiment shown in FIGS. 1 and 2, a suitable rack and pinion unit (not shown) is housed within the upper head 9 and coupled to the uppermost end of tube 7. The rack and pinion unit is connected by a push-pull cable 13 to a suitable foot control (not shown) provided within boat 4.

The trolling motor unit 2 including the lower unit 6 and interconnecting steering and speed controls may of course be of any suitable construction and consequently no further description thereof is given other than in connection with and for purposes of fully explaining the illustrated pivotal mount assembly 5. Pivotal mount assembly 5 may also be of any suitable construction and is therefore only generally described hereinafter. Thus, referring to FIGS. 1 and 2, the pivotal mount assembly 5 includes a pivotable support member or arm 14 which is pivotally interconnected at one end to a mounting bracket 15 by a pivot assembly 16. The opposite or outer end of arm 14 includes a head 17 attached to swivel tube 8 and pivotally interconnected by a pivot assembly 18 at the outer end of arm 14. Arm 14 defines a tubular housing within which a gear train is housed for selectively rotating the head 17 and the interconnected trolling motor unit 2 in response to the pivoting of arm 14 through 180° from its operating position of FIG. 1 to its retracted position of FIG. 2. Thus, as is well-known and illustrated in FIGS. 1 and 2, the gear train within arm 14 is activated automatically by the pivoting of arm 14 between its operating position and its retracted position to rotate the trolling motor unit 2 90°. Thus in the operating position of FIG. 1 arm 14 extends forwardly over bracket 15 with its intermediate portion resting within a U-shaped saddle support 19 integrally formed in the upper side of bracket 15 with the lower unit extending longitudinally of boat 4 while in the raised or retracted transport position of FIG. 2, the arm 14 extends rearwardly from bracket 15 with the lower unit 6 resting on the upper edges of saddle support 19 transversely of the boat.

Further, in the depending or operating position of FIG. 1, arm 14 is typically locked by an arm locking means (not shown which releaseably locks the arm 14 to bracket 15 to prevent pivoting of the arm from the run position. In addition, a gear locking means (not shown) is also typically provided to positively interlock and prevent rotation and loading of the gear train within arm 14 with the trolling motor unit 2 in its run position. Typically, a common release means (not shown) is provided and interconnected with both the arm locking means and the gear locking means to simultaneously release these locking means when desired to raise the trolling motor unit 2 to the retracted position shown in FIG. 2.

The construction heretofore described is well-known in the art and a particularly desirable construction may be found in U.S. Pat. No. 3,999,500 to Friedel et al. The present invention, however, is particularly directed to a latching device 1 used to hold the trolling motor unit 2 in the retracted position shown in FIG. 2.

Referring now to FIG. 3, an over-center type latching device 1 is illustrated for holding unit 2 in its retracted position. Latching device 1 is of the over-center type and includes an arm member 20 and a head member 21. As illustrated, arm member 20 is substantially U-shaped having a lower portion 22 pivotally mounted by a pin 23 to bracket 15 for movement relative to deck 3, an upper portion 24 and an intermediate portion 25 connecting portions 22 and 24. Head member 21 is pivotally connected to the upper end of portion 24 by a pin 26 to permit free rotation of head member 21 with respect to arm member 20. Head member 21 includes a pair of spaced apart legs 27, 28 that define a tube receiving recess 29 therebetween. Recess 29 is dimensioned to receive and fit around tube 7 of trolling motor unit 2 so that tube 7 is substantially captured therein when latching device 1 is in its latched position, as shown in solid lines in FIG. 3.

Head member 21 includes an integral lever 30 extending from leg 27 which provides the operator a mechanical advantage to make operation of device 1 easier. Lever 30 also permits operation of device 1 between its latched and unlatched positions by means of the operator's foot.

A safety lock means is also provided to prevent head member 21 from being rotated to an unlatched position until the safety lock means is manually deactivated. As shown in FIG. 3, the safety lock means includes a ratchet and pawl type mechanism having a plurality of spaced apart teeth 31 integrally formed in the outer periphery of the upper end of portion 24 of arm member 20, and a pawl member 32 integrally formed on lever 30. The outer end of pawl member 32 engages teeth 31 to lock device 1 in its latched position as shown in FIG. 3. To unlock device 1, pawl member 32 includes a tab 33 which is forced in a counterclockwise direction toward lever 30 until the outer end of pawl member 32 clears tooth 31. Head member 21 and arm member 20 may then be rotated to the position shown in phantom lines in FIG. 3 to release tube 7.

In operation, once the trolling motor unit 2 is moved to its retracted position as shown in FIG. 2, latching device 21 may be moved to its latched position which is shown in solid lines in FIG. 3. In order to accomplish this, arm member 20 is pivoted counterclockwise and head member 21 is rotated counterclockwise until recess 29 receives and fits around tube 7. Head member 21 is then further rotated counterclockwise until in its overcenter position shown in FIG. 3. As shown, the overcenter position is defined by the angle between line 34 which extends between the axes of pins 23 and 26 and line 35 which extends between the axes of pin 26 and tube 7. As illustrated, this angle is approximately 6°. Thus, as head member 21 is rotated to its overcenter position, the spring pressure of tube 7 holds it in its latched position. Tube 7 provides the resilient pressure because of its location in the retracted position shown in FIG. 2. In other words, tube 7 extends between lower unit 6 which is supported by saddle support 19 and head 17 of arm 14 so that a downward pressure or force on tube 7 results in a reaction force or spring pressure upwardly against latching device 1.

Although illustrated as being fitted around and receiving tube 7, head member 21 may also be utilized with other types of motor support members depending upn the particular trolling motor unit and/or pivotal mounting assembly employed. Therefore, the latching device 1 is not intended to be limited to use solely with tube 7.

Referring now to FIG. 4, there is illustrated a second embodiment of latching device 1. In this embodiment, latching device 1 includes a substantially U-shaped or arcuate shaped arm member 36 having its lower end pivotally mounted to bracket 15 by a pin 37 for movement relative to deck 3, and its upper end pivotally mounted by a pin 38 to a head member 39. Pin 38 permit free rotation of head member 39 with respect to arm member 36. Head member 39 includes a pair of spaced apart legs 40, 41 that define a tube receiving recess 42 therebetween. Recess 42 is dimensioned to substantially surround and capture tube 7 when in its latched position, as shown in solid lines in FIG. 4. Head member 39 also includes a lever 43 integral therewith that functions to provide the operator with a mechanical advantage to make operation of device 1 easier.

As a safety lock means for holding head member 39 in its latched position, the embodiment shown in FIG. 4 includes a detent 44 formed on the surface of head member 39. Detent 44 is in the form of a projection or boss formed on the surface of head member 39, and when in the latched position shown in solid lines in FIG. 4, detent 44 engages the upper edge surface of arm member 36 to prevent clockwise rotation of head member 39. Thus, in order to rotate head member 39 clockwise to an unlatched position, as shown in phantom lines in FIG. 4, the operator must move head member 39 in a clockwise direction and force detent 44 past the surface of arm member 36.

In operation, once the trolling motor unit 2 is raised to its retracted position shown in FIG. 2 arm member 36 is rotated counterclockwise and head member 39 is positioned so that recess 42 receives tube 7. Head member 39 is then further rotated in a counterclockwise direction until it reaches its overcenter position. The overcenter position for head member 39 is defined by the angle formed between line 45 extending between the axes of pin 37 and 38 and line 46 extending between the axs of pin 38 and tube 7. In the embodiment shown in FIG. 4, this angle is approximately 12°. The spring pressure of tube 7 thus holds head member 39 and arm member 36 in its latched position.

The present invention thus provides an improved latching device for a deck mounted trolling motor unit which can be manufactured as a long life assembly and conveniently and safely operable by a boater or fisherman. The latching device 1 provides a positive means for holding the motor trolling unit 2 in its retracted position, and must be positively released in order to permit pivoting of the trolling motor unit 2 to its operating or run position.

Various modes of carrying out the invention are contemplated as being within the scope of the following claims particularly pointing and distinctly claiming the subject matter which is regarded as the invention.

I claim:

1. A latching device for holding an outboard motor apparatus having a motor support member in a retracted position on a boat deck, comprising:

an arm member including an inner end pivotally mounted for movement relative to the deck, and a free outer end;

a head member pivotally mounted to the outer end of said arm member and movable between a latched and unlatched position, said head member including a portion for receiving the motor support member in an over-center relationship therewith such that said support member provides a biasing force against said head member to bias said head member in said over-center relationship; and safety lock means operable to hold said head member in said over-center latched relationship, said safety lock means including a latch means on said head member engageable with an abutment means on said arm member.

2. The device of claim 1 wherein said arm member is substantially U-shaped.

3. The device of claim 1 wherein said motor support member receiving portion is defined by a recess formed in said head member.

4. The device of claim 1 wherein said head member includes a lever projecting therefrom.

5. Th device of claim 1 wherein said overcenter relationship is defined by the angle formed between a first line extending between the axes of the pivot connections of said arm member and a second line extending between the axis of the pivot connection of said head member and the axis of said motor support member.

6. The device of claim 1 wherein the latch means of said safety lock means includes a pawl member pivotable on said head member and said abutment means includes a tooth member formed on said arm member.

7. The device of claim 1 wherein the latch means of said safety lock means includes detent means on said head member, and said abutment means includes a surface on the outer end of said arm member.

* * * * *